(12) United States Patent
Noro et al.

(10) Patent No.: US 6,674,013 B2
(45) Date of Patent: Jan. 6, 2004

(54) BUSHING CAPABLE OF SERVING AS WATERTIGHT PACKING AND WATERTIGHT STRUCTURE USING THE BUSHING

(75) Inventors: Junichi Noro, Akita (JP); Hirokazu Awa, Akita (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 10/118,619

(22) Filed: Apr. 5, 2002

(65) Prior Publication Data

US 2002/0144839 A1 Oct. 10, 2002

(30) Foreign Application Priority Data

Apr. 10, 2001 (JP) ........................................ 2001-110874

(51) Int. Cl.[7] ............................................... H01B 17/26
(52) U.S. Cl. .............................. 174/152 B; 174/14 BH; 174/17.06
(58) Field of Search ........................ 174/152 G, 14 BH, 174/17.06, 65 R, 65 G, 152 R, 153 G, 68.3; 52/206, 811

(56) References Cited

U.S. PATENT DOCUMENTS

| | | | | |
|---|---|---|---|---|
| 3,696,321 A | * | 10/1972 | Cooper, Jr. | 174/152 R |
| 4,248,459 A | * | 2/1981 | Pate et al. | 174/49 |
| 5,541,363 A | * | 7/1996 | Weise et al. | 174/38 |
| 5,912,431 A | * | 6/1999 | Sheehan | 174/65 R |
| 5,912,434 A | * | 6/1999 | Robinson | 174/51 |

* cited by examiner

Primary Examiner—Dean A. Reichard
Assistant Examiner—Jinhee Lee
(74) Attorney, Agent, or Firm—Frishauf, Holtz, Goodman & Chick, P.C.

(57) ABSTRACT

A bushing is provided for placement on a cable to be held between an upper cover and a lower cover of an apparatus. The bushing has a flange on an outer peripheral surface thereof, and the flange extends perpendicular to the cable on which the bushing is put. The upper cover and the lower cover of the apparatus are attached to form a unit, and the upper cover comprises a flange receiving portion. The flange comes closely into contact with the flange receiving portion to fix the cable against the upper cover and serve as a watertight packing. As a result, a simple watertight structure is provided.

8 Claims, 3 Drawing Sheets

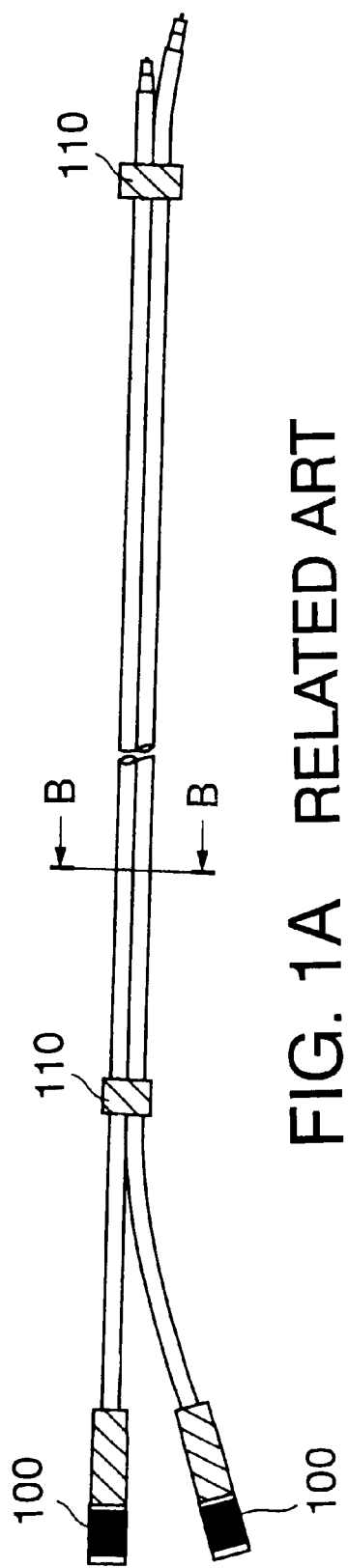
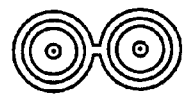
FIG. 1A RELATED ART
FIG. 1B RELATED ART

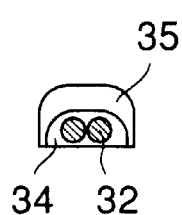
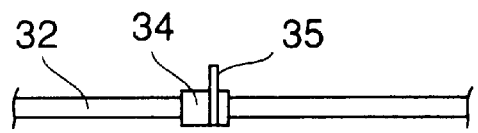
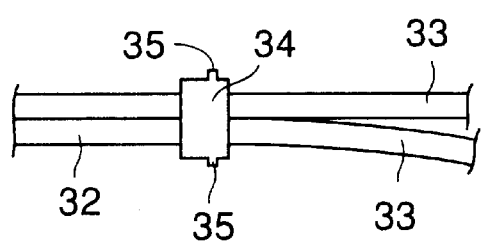
FIG. 3B
FIG. 3C
FIG. 3A
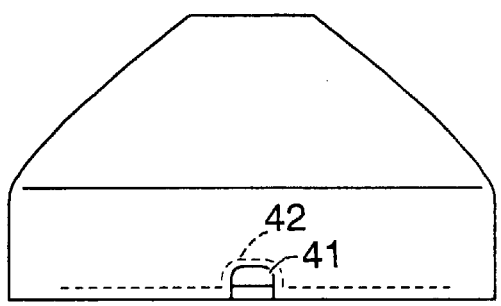
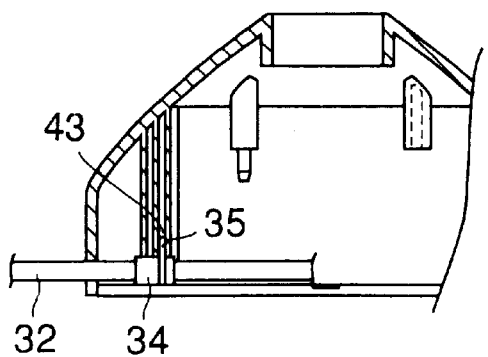
FIG. 4A
FIG. 4B

BUSHING CAPABLE OF SERVING AS WATERTIGHT PACKING AND WATERTIGHT STRUCTURE USING THE BUSHING

BACKGROUND OF THE INVENTION

This invention relates to a bushing used for preventing a multiple cable from separating into individual cables, in particular, to a watertight structure using the bushing.

A multiple cable comprises a plurality of insulated cables which are in parallel to one another and united in a body in a state that they can be easily separated from one another by hands (or external force). The multiple cable is generally ramified into the insulated cables at each end thereof. Bushings are put on an outer circumferential surface of the multiple cable near the ends of the multiple cable. The bushings prevent ramified parts of the multiple cable from extending.

When the multiple cable is connected to an outdoor apparatus such as an antenna unit, it is electrically connected to the outdoor apparatus inside the outdoor apparatus. That is, one end of the multiple cable is put in the inside of the outdoor apparatus. In this case, it is necessary to take measures to prevent water from entering the inside of the apparatus along the multiple cable. An existing watertight structure for the outdoor apparatus comprises a water-tight packing which is placed in a notch or opening formed in a case or cover of the outdoor apparatus to pass the multiple cable through. The water-tight packing is made of water-resistant elastic body such as synthetic rubber.

By the way, it is desirable that the multiple cable is mechanically fixed to the outdoor apparatus except for the electrically connection to obtain sufficient mechanical connection strength between the multiple cable and the outdoor apparatus. However, the outdoor apparatus must have a complex structure to mechanically fix the multiple cable. This is because the outdoor apparatus already has a portion for the water-tight packing and another portion is necessary for the mechanically fixing.

SUMMARY OF THE INVENTION

It is therefore an object of this invention to provide a simple water-tight structure for an outdoor apparatus to which a multiple cable is connected.

Other object of this invention will become clear as the description proceeds.

According to an aspect of this invention, a bushing is put on a cable. The bushing comprises a main body having an outer peripheral surface. A flange is formed on the outer peripheral surface.

In the bushing, the flange extends perpendicular to the cable.

In addition, the outer peripheral surface includes a lower surface of the body. The flange is formed on the outer peripheral surface except for the lower surface.

According to another aspect of this invention, a water-tight structure is used in an apparatus to which a cable is connected. The cable extends from the outside of a cover of the apparatus to the inside of the cover. The water-tight structure comprises a bushing which has a flange extending perpendicular to the cable when the bushing is put to the cable. A flange receiving portion is formed inside the cover and closely comes into the flange to make the bushing serve as a water-tight packing.

BRIEF DESCRIPTION OF THE DRAWING

FIG. 1A is a plan view of a twin cable with existing bushings;

FIG. 1B is a sectional view taken along a line B—B in FIG. 1A;

FIG. 3A is a bottom plan view of the water-tight bushing attached to the twin cable;

FIG. 3B is a side view of the water-tight bushing attached to the twin cable;

FIG. 3C is a front view of the water-tight bushing;

FIG. 4A is a partial front view of a top cover of the antenna apparatus;

FIG. 4B is a partial longitudinal sectional view of the antenna apparatus to which the twin cable and the water-tight bushing are combined.

DESCRIPTION OF THE PREFERRED EMBODIMENTS

Figure 2:
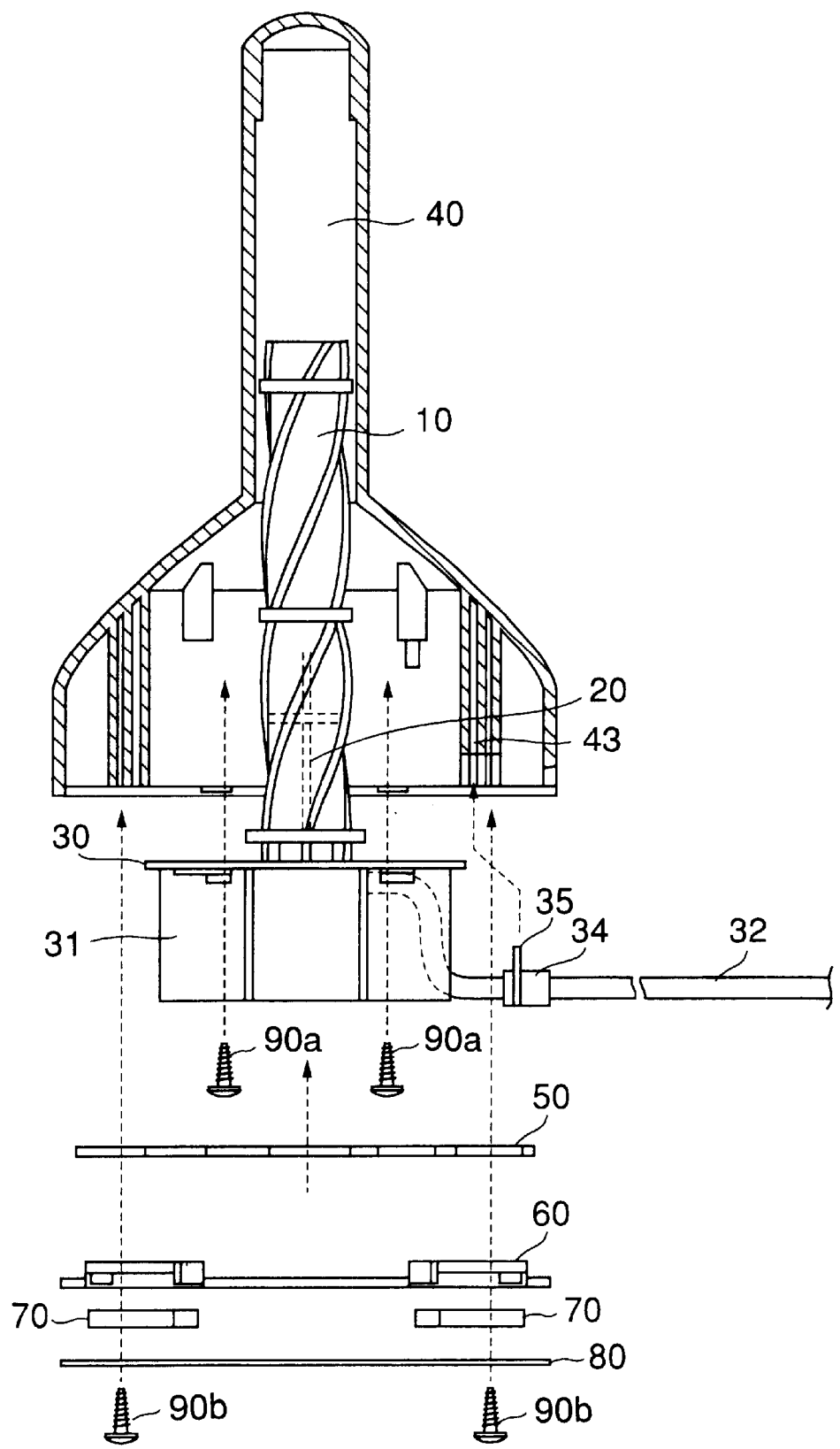
FIG. 2 is an exploded longitudinal sectional view of an antenna apparatus which is combined with a water-tight busing according to a preferred embodiment of this invention.

At first, description will be directed to a multiple cable to which existing bushings are attached for a better understanding of this invention.

The multiple cable is used for connecting between electronic/electric apparatuses. The multiple cable comprises a plurality of insulated cables. Each of the insulated cables comprises, for example, an inner conductor, an outer conductor, an insulator between the inner conductor and the outer conductor, and an outer insulating cover covering the outer conductor. The insulated cables are in parallel to one another and united in a body in a state that they can be easily separated from one another by hands (or external force). For instance, a twin or double cable is as shown in FIGS. 1A and 1B. That is, the twin cable comprises two insulated cables parallel to each other. The insulated cables have outer insulating covers united in a body at a contact part between them.

Generally, the type of the cable is used in the state that the insulated cables are mostly united in a body between the electronic/electric apparatuses. This is because it is easy to handle and wiring is simple between the electronic/electric apparatuses. As regards each end of the cable, the insulated cables are separated from one another to easily connect to terminals, which is distant from one another, of each electronic/electric apparatus. For example, each end of the twin cable is separated into individual insulated cables as illustrated in FIG. 1A. Additionally, the twin cable of FIG. 1 has connectors 100 connected to ones of the ends of the insulated cables.

As easily understood from the above mention, the multiple cable has two separated parts and a united part between the separated parts.

When the insulated cables receives external force which separates the insulated cables from one another at each of the separated parts, the united part gradually changes the separated part. In other words, the separated part is lengthened and the united part is shortened by the external force. Thus, the multiple cable is easily separated into individual insulated cables by the external force. As shown in FIG. 1A, bushings 110 are put on the multiple cable near the ends of the multiple cable so that undesirable external force does not separate the multiple cable into individual insulated cables.

By the way, a radio receiving apparatus mounted on a movable body, such as an automobile, comprises an antenna unit located outside the movable body and a receiver unit located inside the movable body. Accordingly, a cable is necessary to connect the antenna unit to the receiver unit. If the radio receiving apparatus comprises a digital radio receiving apparatus which has two antennas in the antenna unit, the multiple cable is frequently used as the cable connecting the antenna unit to the receiver unit.

An outdoor apparatus such as the antenna unit is exposed to the weather. Accordingly, watertight measures are indispensable to connecting between the cable and the outdoor apparatus.

At present, a watertight packing is used as the water-tight measures for preventing the water from entering the inside of the outdoor apparatus. The watertight packing is made of water-resistant elastic body such as synthetic rubber. The water-tight packing is placed at an opening which is formed in a case or cover of the outdoor apparatus to pass the cable through.

In the meantime, the cable is not only electrically connected to the outdoor apparatus at the end thereof but also mechanically fixed to the case of the outdoor apparatus at a point distant from the end. This is made to increase mechanical connection strength between the cable and the outdoor apparatus. If the bushing is attached to the cable, there is a case where the bushing is used for the mechanical connection between the cable and the outdoor apparatus. In this case, the bushing is engaged with a engaging portion formed in the case of the outdoor apparatus.

As mentioned above, the outdoor apparatus needs both of the watertight structure and the mechanical fixing structure to connect with the cable. Therefore, the outdoor apparatus has a problem that it is complex in structure and needs many parts and assembly is complicated.

Referring to FIGS. 2 through 4, the description will proceed to a watertight structure using a watertight bushing according to a preferred embodiment of this invention.

FIG. 2 shows an antenna unit applied with the watertight structure and used in a digital radio receiving apparatus for an automobile.

The antenna unit is placed inside the automobile. The antenna unit comprises a helical antenna 10 having a hollow cylindrical shape. A monopole antenna 20 is placed inside the helical antenna 10. A phase shifter board 30 is for mounting with both of the helical antenna 10 and the monopole antenna 20. A top Cover 40 is for covering the helical antenna 10 with the monopole antenna 20 and the phase shifter board 30. The antenna unit further comprises a rubber packing 50, a bottom cover 60, four magnets 70, a label (or a PET sheet) 80, screws 90a and 90b and others.

The phase shifter board 30 on which the helical antenna 10 and the monopole antenna 20 are provided is a printed circuit board having an under surface on which low noise amplifiers are mounted and which a shield cover 31 are fixed. The helical antenna 10 and the monopole antenna 20 are fixed to the phase shifter board 30 and electrically connected to the low noise amplifiers. A cable 32 is connected to the phase shifter board 30 so that the antenna unit is connected to a radio receiver (not shown) placed inside the automobile. The cable 32 extends to the outside of the top cover 40 through a cable passage formed at the lower end of the top cover 40.

The helical antenna 10 and the monopole antenna 20 form an antenna assembly together with the phase shifter 30. The antenna assembly is inserted into the top cover 40 so that the top of the helical antenna 10 reaches a predetermined point near the tip end of the top cover 40. In this situation, the phase shifter board 30 is fixed with screws 90a. Then, the rubber packing 50, the bottom cover 60, the magnets 70 and label 80 are fixed to the lower end of the top cover 40 with the screws 90b.

In the antenna unit with the structure mentioned above, the rubber packing 50 between the top cover 40 and the bottom cover 60 mainly prevents water from entering the inside of the antenna unit.

Next, the description will be made about the bushing according to the preferred embodiment of this invention with referring to FIGS. 3A–3C.

As illustrated in FIGS. 3A and 3B, the cable 32 comprises a multiple cable having a plurality of insulated cables (herein two cables) which are united in a body in a state that they can be easily separated from one another by external force. The bushing 34 is put on the cable 32 so that the undesirable external force does not separate the cable 32 into individual insulated cables.

The bushing 34 comprises a main body and flange 35. The main body has an outer peripheral surface parallel to the cable. The outer peripheral surface includes a lower surface of the main body. The flange is formed on the outer peripheral surface except for the lower surface. In addition, the flange 35 extends perpendicular to the cable 32.

A general bushing has an oval shape in section. However, the main body of the bushing 34 has a semicylindrical or hog-backed shape in section as shown in FIG. 3C. This is also true of the flange 35.

As illustrated in FIG. 4A, the cable passage is provided by an outer wall and an inner wall(s) of the top cover 40. That is, notches or opening 42 and 42 are formed in the outer wall and the inner wall of the top cover 40, respectively. The notch 41 formed in the outer wall has a shape corresponding to the multiple cable 32 while the notch 42 formed in the inner wall has a shape corresponding to the bushing 34. The flange 35 of the bushing 34 is larger than the notches 41 and 42.

The bushing 34 with the flange 35 can be made by an integral molding using synthetic resin, synthetic rubber, or the like.

As shown in FIG. 4B, the inner walls provides a cavity (or a flange receiving portion) 43 to correspond to the flange 35 of the bushing 34. The cavity 43 has a width which is substantially equal to thickness of the flange 35.

The bushing 34 is put into the notch 42 to closely come into contact with the inner walls of the top cover 40 in a state such that the flange 35 is inserted into the cavity 34. In this situation, the bushing 34 is fixed to the cover 40. Furthermore, the bushing 34 fixes the cable 32 against the top cover 40 and prevents water from entering inside the inner walls. That is, the bushing 34 serves both as a fixing member and a watertight packing.

Though the flange 35 is not formed on the lower surface of the bushing 34, the rubber packing 50 closely comes in contact with the lower part of the bushing 34 and prevents water from entering inside the inner walls of the top cover 40.

While this invention has thus far been described in conjunction with a preferred embodiment thereof, it will readily be possible for those skilled in the art to put this invention into practice in various other manners. For example, the cavity 41 may be formed in a top surface of one inner wall of the top cover 40. Alternatively, the bushing 34 may have to flanges to put an edge of an inner wall which provides the notch 42 between them. At any rate, in the watertight structure of this invention, the bushing 34 has at least one flange while the top cover has at least one flange receiving portion for engaging the flange to fix the bushing and to make the bushing serve as a watertight packing.

Furthermore, this invention is applicable to not only an antenna unit but also other apparatuses.

What is claimed is:

1. An antenna apparatus comprising:

an antenna element;

a top cover that covers said antenna element and that has a cable passage at a lower end;

a bottom cover attached to said lower end of said top cover to form a unit;

a cable connected to said antenna element and extending from inside of said unit to outside of said unit through said cable passage; and a bushing placed on said cable and held between said top cover and said bottom cover for fixing said cable to said unit;

wherein said bushing comprises a main body having an outer peripheral surface, and a flange formed on said outer peripheral surface; and wherein said top cover comprises a flange receiving portion provided in an internal space of said top cover for receiving said flange when said bushing is held between said bottom cover and said top cover.

2. An antenna apparatus as claimed in claim 1, wherein said flange extends perpendicular to said cable.

3. An antenna apparatus as claimed in claim 2, wherein:

said outer peripheral surface of said main body comprises a lower surface and a flange formation surface connected between two sides of said lower surface; and said flange is formed on said flange formation surface of said outer peripheral surface.

4. An antenna apparatus as claimed in claim 3, wherein:

said flange receiving portion is defined by first and second walls extending downward from an inner surface of said top cover; and said bushing is held between said top cover and said bottom cover in a manner such that said flange is inserted between said first and said second walls, lower ends of said first and said second walls are close to said flange formation surface, and said lower surface of said main body is close to said bottom cover.

5. An antenna apparatus as claimed in claim 1, wherein said bushing serves as a watertight packing to prevent water from entering said unit.

6. An antenna apparatus as claimed in claim 5, wherein said flange of said bushing comes into close contact with said flange receiving portion to serve as said watertight packing.

7. An antenna apparatus as claimed in claim 1, wherein both said main body and said flange are made of synthetic resin.

8. An antenna apparatus as claimed in claim 7, wherein said main body and said flange are made by integral molding.

\* \* \* \* \*